US010715469B2

(12) United States Patent
Hawker et al.

(10) Patent No.: US 10,715,469 B2
(45) Date of Patent: Jul. 14, 2020

(54) POISONED MESSAGE DETECTION SYSTEM

(71) Applicant: International Business Machines Corporation, Armonk, NY (US)

(72) Inventors: Samuel Hawker, Winchester (GB);
Adam J. Pilkington, Eastleigh (GB);
Matthew Chirgwin, Eastleigh (GB);
Andrew Dunnings, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/135,629

(22) Filed: Sep. 19, 2018

(65) Prior Publication Data
US 2020/0092236 A1 Mar. 19, 2020

(51) Int. Cl.
H04L 12/58 (2006.01)
G06Q 30/02 (2012.01)
G06F 40/226 (2020.01)

(52) U.S. Cl.
CPC ............ *H04L 51/06* (2013.01); *G06F 40/226* (2020.01); *G06Q 30/0281* (2013.01); *H04L 51/12* (2013.01); *H04L 51/14* (2013.01)

(58) Field of Classification Search
CPC ......... H04L 51/06; H04L 51/14; H04L 51/12; G06F 40/226; G06Q 30/0281
USPC ........................................................ 709/206
See application file for complete search history.

(56) References Cited

U.S. PATENT DOCUMENTS

| 8,806,611 | B2 | 8/2014 | Saroj et al. |
| 8,959,530 | B1 | 2/2015 | Leonard |
| 9,674,127 | B2 | 6/2017 | Kesavan et al. |
| 10,019,340 | B2 | 7/2018 | Nicol et al. |
| 2008/0155693 | A1* | 6/2008 | Mikan ............... H04L 51/12 726/23 |
| 2013/0333028 | A1* | 12/2013 | Hagar ............... H04L 63/0236 726/22 |
| 2015/0381511 | A1* | 12/2015 | Word ............... H04L 47/50 709/223 |
| 2017/0064027 | A1 | 3/2017 | Grenader |
| 2017/0223046 | A1* | 8/2017 | Singh ............... H04L 43/062 |
| 2017/0295119 | A1* | 10/2017 | Rosenberg ........... H04L 51/046 |

(Continued)

FOREIGN PATENT DOCUMENTS

| CN | 107038162 A | 8/2017 |
| EP | 1462941 B1 | 4/2015 |

OTHER PUBLICATIONS

Grujic, "Surviving poison messages in MSMQ," CodeProject, copyright 2005, accessed Aug. 18, 2018, 11 pages. https://www.codeproject.com/articles/10841/surviving-poison-messages-in-MSMQ.

(Continued)

*Primary Examiner* — Chris Parry
*Assistant Examiner* — Weiwei Y Stiltner
(74) *Attorney, Agent, or Firm* — Yee & Associates, P.C.

(57) ABSTRACT

A method, apparatus, system, and computer program product for processing messages. A message is received from a producer by a computer system. The message is sent to a consumer by the computer system. The message is sent to a set of consumers in addition to the consumer by the computer system in response to an adverse condition being present for the consumer after sending the message the consumer. A set of actions is performed in response to the adverse condition being present in the set of consumers receiving the message.

20 Claims, 7 Drawing Sheets

(56) References Cited

U.S. PATENT DOCUMENTS

2017/0310628 A1 10/2017 Norwood et al.
2018/0048741 A1 2/2018 Shcherbakov et al.
2018/0060143 A1 3/2018 Uttamchandani et al.
2018/0167476 A1 6/2018 Hoffner et al.
2020/0092183 A1 3/2020 Pilkington

OTHER PUBLICATIONS

ByAlexBlog, "RabbitMQ poisoned messages handeling," Feb. 9, 2016, accessed Aug. 18, 2018, 13 pages. https://byalexblog.net/rabbitmq-poisoned-messages-handeling.

Mansour et al., "I-RMI: Performance Isolation in Information Flow Applications," IFIP International Federation for Information Processing, Lecture Notes in Computer Science, vol. 3790, Springer, Berlin, Heidelberg, 2005, pp. 377-391.

List of IBM Patents or Applications Treated as Related, 2 pages.

Office Action, dated May 13, 2020, regarding U.S. Appl. No. 16/135,725, 22 pages.

\* cited by examiner

POISONED MESSAGE DETECTION SYSTEM

BACKGROUND

1. Field

The disclosure relates generally to an improved computer system and, more specifically, to a method, apparatus, and system for detecting poison messages.

2. Description of the Related Art

Messaging services can operate to distribute data received from applications who are producers of the data. The data can be received by a messaging service from producers in a form of messages and stored for distribution to applications who are consumers of the data.

For example, the messaging service can place the messages received from producers into categories or topics. Consumers are software applications that can subscribe to one or more of these categories or topics to receive messages of interest from the messaging service. The messaging service acts as an intermediary between the producers and the consumers. For example, the messaging service can be used to publish messages for new articles, financial events, logs, help desk events, website activity metrics, operational monitoring data, malware events, and other types of data.

In some cases, issues can occur when processing a message such that the service to the client is disrupted. This type of message is a poison message. For example, a poison message may not be processed because the message is malformed. The malformed message can cause the consumer to hang or crash. The consumer may attempt to keep rereading the message, causing the consumer to hang. In another example, the consumer may crash as a result of processing the message.

A message can be malformed in a number of different ways. For example, a malformed message can have content that conforms to a schema, such as using a string instead of number, or a number that too large. A malformed message can occur when illegal characters are present in the message. For example, the message can be malformed if the message stream includes bites and non-ASCII characters. Truncated messages or messages that cause heap issues or buffer overflows. In some cases, a message can be intentionally created in which content is correct but causes the consumer to crash by mis-parsing the content. In other examples, a malformed message may include conflicting contents that cause the consumer to take locks on resources that result in deadlock. In another example, a malformed message can include content that causes overloading of a central processor unit in which the consumer runs.

One manner in which a poison message can be identified is by comparing the message with a schema. The schema can define an allowed message, a poison message, or both. This type of system requires prior knowledge for messages that are received. Depending on the messaging system, the prior knowledge about the messages may not be present.

Therefore, it would be desirable to have a method and apparatus that take into account at least some of the issues discussed above, as well as other possible issues. For example, it would be desirable to have a method and apparatus that overcome a technical problem with handling poison messages in a messaging system.

SUMMARY

According to one embodiment of the present invention, a method is present for processing messages. A message is received from a producer by a computer system. The message is sent to a consumer by the computer system. The message is sent to a set of consumers in addition to the consumer by the computer system in response to an adverse condition being present for the consumer after sending the message the consumer. A set of actions is performed by the computer system in response to the adverse condition being present in the set of consumers receiving the message.

According to another embodiment of the present invention, a message processing system comprises a computer system. The computer system receives a message from a producer and sends the message to a consumer. The computer system sends the message to a set of consumers in addition to the consumer in response to an adverse condition being present for the consumer after sending the message the consumer. The computer system performs a set of actions in response to the adverse condition being present in the set of consumers receiving the message.

According to yet another embodiment of the present invention, a computer program product for processing messages comprises a computer-readable-storage media, first program code, second program code, third program code, and fourth program code stored on the computer-readable storage media. First program code is run receive a message from a producer. The second program code is run to send a message to the consumer. The third program code is run to send the message to a set of consumers in addition to the consumer in response to an adverse condition being present for the consumer after sending the message the consumer. The fourth program code is run to performs a set of actions in response to the adverse condition being present in the set of consumers receiving the message.

DETAILED DESCRIPTION

Figure 1:
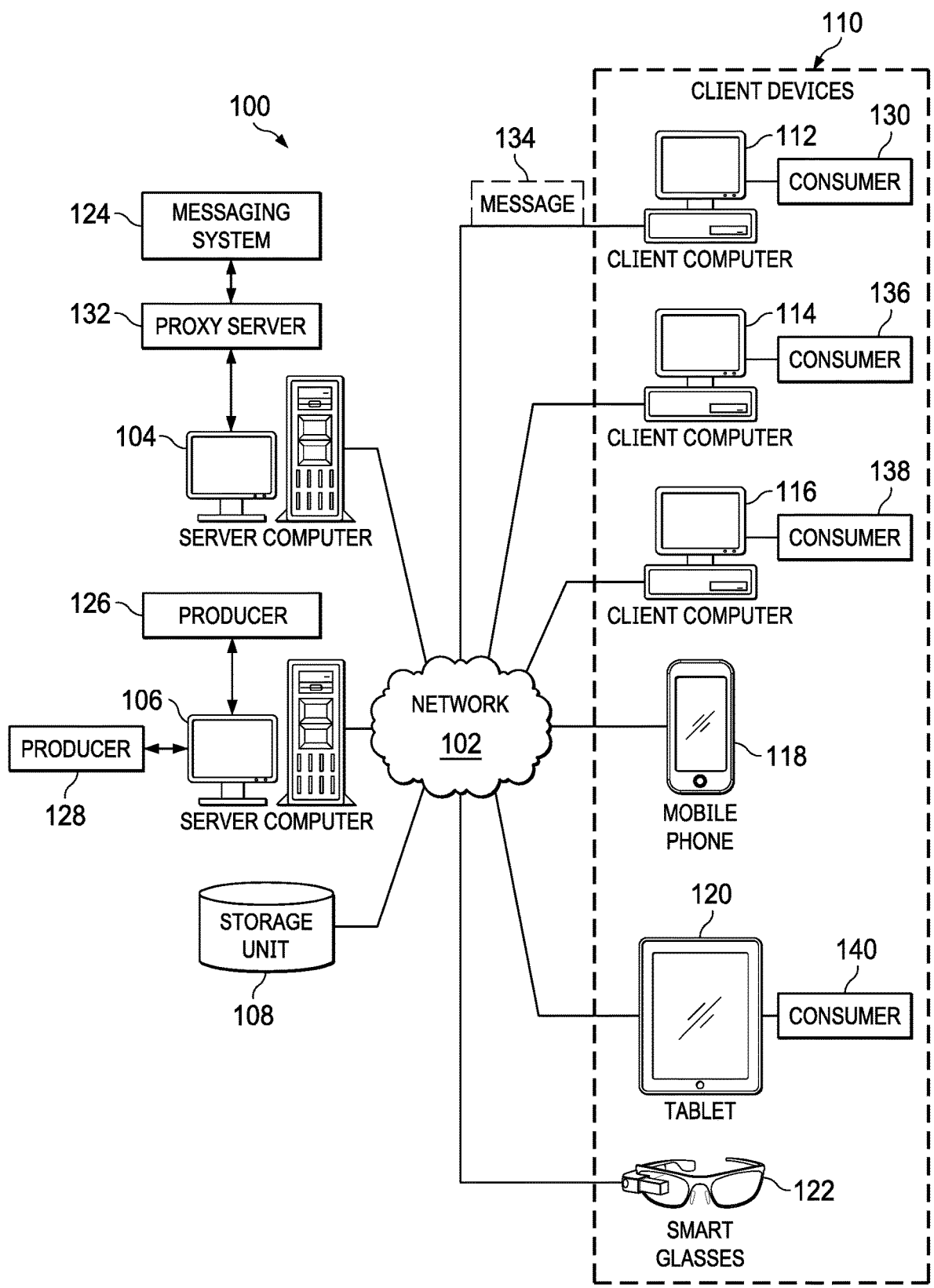
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more considerations. For example, the illustrative embodiments recognize and take into account that identifying a source of a poison message is easier when messages are sent point-to-point from one application to another application. The illustrative embodiments recognize and take into account that, with a messaging system, determining a source of a poison message is more difficult when many producers can send messages for distribution to the messaging system. The illustrative embodiments also recognize and take into account that current messaging systems with multiple producers of data do not provide an ability to identify the source of a poison message.

Additionally, the illustrative embodiments recognize and take into account that, in some instances, the message may not cause the consumer to hang or fail. Instead, the illustrative embodiments recognize and take into account that the consumer may have design issues that cause the consumer to hang or fail rather than the message itself being the cause. For example, the illustrative embodiments recognize and take into account that one type of consumer may hang or fail processing a message while other types of consumers are able to handle the same message without an issue. The illustrative embodiments recognize and take into account that determining a source of an undesired behavior in a consumer cannot be easily determined in current messaging systems.

Thus, the illustrative embodiments provide a method, apparatus, system, and computer program product for handling poison messages. In one illustrative example, a computer system receives a message from a producer. The computer system sends the message to a consumer. The computer system monitors the consumer for an adverse condition. The computer system sends the message to a set of consumers in response to the adverse condition being present. Further, when the message is received from the producer, the computer system can mark the message with a unique identifier and associate that identifier with the producer of message.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, messaging system 124 runs on server computer 104. In this illustrative example, messaging system 124 operates using a publish and subscribe messaging pattern. For example, producer 126 and producer 128 are software applications running on server computer 106 which can publish messages for distribution to client devices 110 without directly sending the messages to client devices 110.

In this illustrative example, producer 126 and producer 128 generate messages for distribution. For example, producer 126 and producer 128 can produce messages that contain logs, news articles, temperature data, or other types of data that are published to messaging system 124. Producer 128 can generate messages with the same or different types of data from producer 126.

Software applications in client devices 110 subscribe to messages for different topics for category for which interest is present. These software applications are referred to as consumers of the messages distributed by messaging system 124. For example, consumer 130 running on client computer 112 can subscribe to messages published on messaging system 124. Consumer 130 is a software application that receives messages from messaging system 124.

In this example, proxy server 132 operates to detect and handle poison messages that may be sent to messaging system 124 from a producer, such as producer 126. Poison messages are messages that when sent to consumer 130 can cause an undesired effect on consumer 130.

As depicted, proxy server 132 enables handling poison messages with proxy server services in proxy server 132 that are between producer 126 and messaging system 124 and between consumer 130 and messaging system 124. In other words, the proxy server services are in front of both producer 126 and consumer 130.

In this illustrative example, proxy server 132 adds an indicator to messages received from producer 126. The indicator can be, for example, an identifier in a header assigned to each message from producer 126 that identifies producer 126 as the source of the messages. The indicators can be unique with respect to producer 126 but does not have to be unique for each message received from producer 126. In a similar fashion, proxy server 132 assigns another header with a different identifier to each message from producer 128 that identifies the message as being from producer 128.

Proxy server 132 can monitor activities of consumer 130 to determine the state of consumer 130 in consuming messages from messaging system 124. After message 134 is sent to producer 126 from messaging system 124 via proxy server 132, proxy server 132 can determine whether an adverse condition is present for consumer 130. For example, proxy server 132 can determine whether the connection between consumer 130 and messaging system 124 has been dropped. In another example, proxy server 132 can determine whether an undesired period of time has passed since consumer 130 last requested a message from messaging system 124 after receiving message 134. These situations can indicate that message 134 is a poison message and consumer 130 is unable to handle or process message 134. These adverse conditions for consumer 130 can indicate that consumer 130 has hung, crashed, or has some other undesired condition.

If an adverse condition is present for consumer 130, the header for message 134 can be examined to identify producer 126 as originating message 134. In the illustrative example, proxy server 132 can determine whether consumer 130 has the adverse condition because of message 134 or if some other cause may have resulted in the adverse condition. As depicted, proxy server 132 sends message 134 to other consumers. These other consumers are "test subjects" or "canaries" and used to confirm whether message 134 is actually a poison message. In some cases, program code in consumer 130 may have a flaw or error that causes consumer 130 to hang or crash rather than message 134 causing the adverse condition in consumer 130.

In this illustrative example, message 134 is sent to consumer 136 running on client computer 114, consumer 138 running on client computer 116, and consumer 140 running on tablet computer 120. If these consumers also end up having an adverse condition after receiving message 134, message 134 can be considered a poison message.

Although this process may cause other consumers to fail, this process provides a mechanism to ascertain that the reason for the consumer failing was due to receiving a poison message. In this manner, the identification can be used to eliminate or reduce the effect of the messages generated by a message producer generating poison messages.

When the poison message is verified with this additional testing, proxy server 132 can take an action with respect to producer 126. For example, proxy server 132 can reduce the number of consumers who can receive messages from producer 126, reduce the number of messages received from producer 126, or take some other suitable action. The reduction of the number of messages that can be received from producer 126 could be as low as zero, effectively blocking producer 126.

Thus, proxy server 132 can operate to differentiate between a message causing a consumer to hang or crash and a flaw in the design of the consumer causing the consumer to hang or crash. Further, proxy server 132 operates to identify the producer originating a poison message, enabling an action to be taken with respect to the producer of the poison message. In the illustrative example, these actions can include at least one of restricting messages from the producer, restricting how many consumers receive messages from the producer, sending a notification to an administrator, generating an alert, reading a blog entry, or some other suitable action that may be used to identify the producer creating the issue. With the identification of the producer, other actions can be performed with respect to the producer to the problem in addition to or in place of restricting messages from the producer. For example, the producer can be restarted, reconfigured, reinstalled, or some other action can be taken.

The illustration of this example in FIG. 1 is not meant to limit the manner in which other illustrative embodiments can be implemented. For example, other producers in addition to in place of producer 128 and producer 126 can be present. These other producers can run on one or more other computers in place of or in addition to server computer 106.

Figure 2:
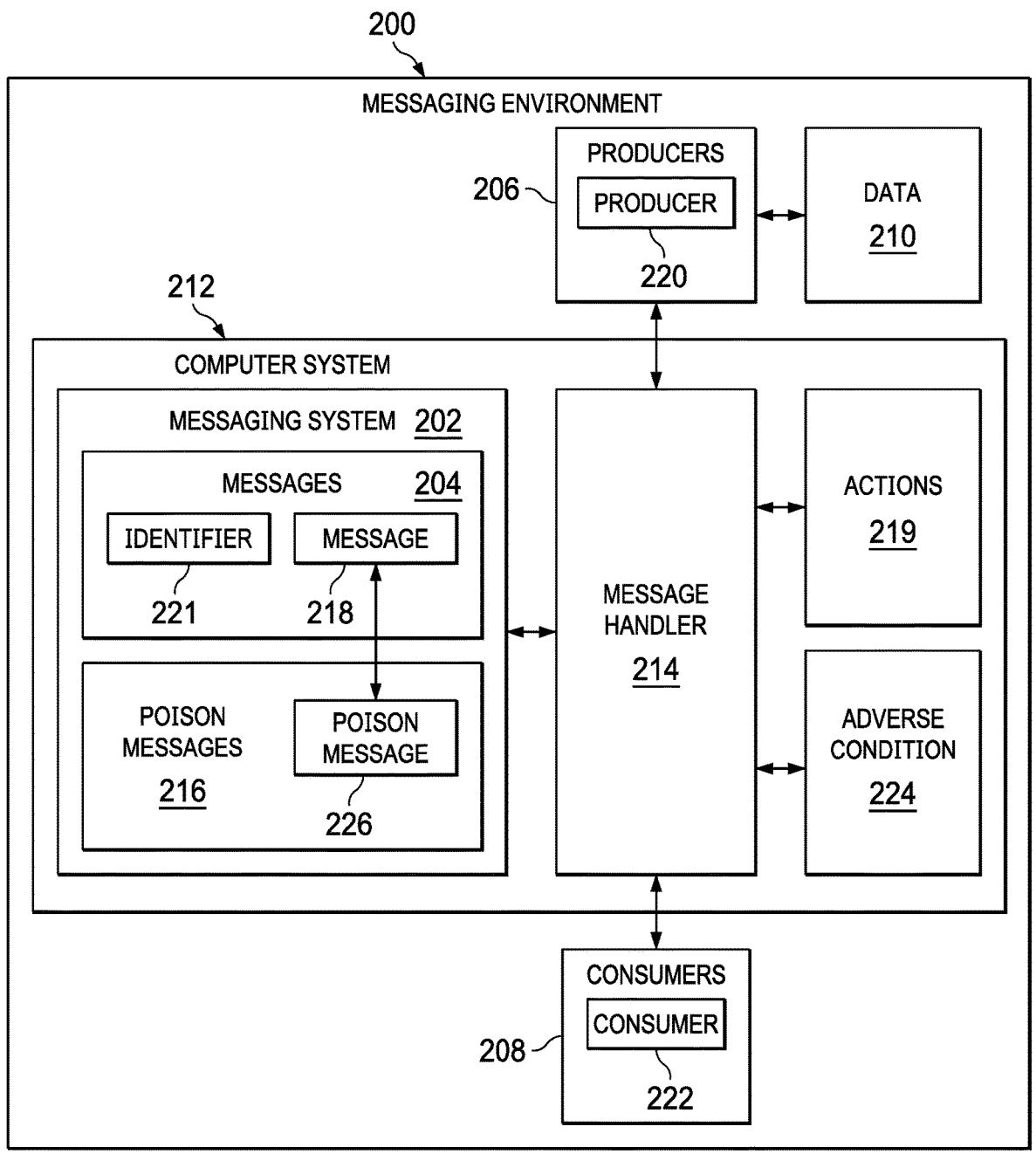
FIG. 2 is a block diagram of a messaging environment in accordance with an illustrative embodiment.

With reference now to FIG. 2, a block diagram of a messaging environment is depicted in accordance with an illustrative embodiment. In this illustrative example, messaging environment 200 includes components that can be implemented in hardware such as the hardware shown in network data processing system 100 in FIG. 1.

In this illustrative example, messaging system 202 in messaging environment 200 facilitates the distribution of messages 204 created by producers 206 to consumers 208. A producer is a software application that generates data 210 that can be sent in messages 204 to messaging system 202. A consumer is a software application that receives messages 204 from messaging system 202.

As depicted, messaging system 202 runs on computer system 212 and is a software platform that can handle real-time data feeds. Messaging system 202 can be used to process streaming data. In one illustrative example, messaging system 202 can be a message broker such as Apache Kafka, Celery, Oracle Message Broker, or some other suitable platform.

In this illustrative example, message handler 214 in computer system 212 operates as an intermediary between producers 206 and messaging system 202. Message handler 214 also operates as an intermediary between consumers 208 and messaging system 202. In some illustrative examples, message handler 214 can be a proxy server for messaging system 202.

As depicted, message handler 214 operates to handle poison messages 216. In handling poison messages 216, message handler 214 can perform functions including at least one of monitoring for poison messages 216, determining when consumers 208 are undesirably affected by poison messages 216, or identifying which ones of producers 206 sent poison messages 216, or other suitable functions with respect to poison messages 216.

In one illustrative example, message handler 214 in computer system 212 processes messages 204. For example, message handler 214 in computer system 212 receives message 218 from producer 220 in producers 206. In this illustrative example, message handler 214 assigns identifier 221 to message 218. Identifier 221 is a unique identifier with respect to producer 220. In other words, identifier 221 can be used to identify producer 220 as the originator of message 218.

Message handler 214 sends message 218 to messaging system 202 for storage and consumption by consumers 208. In this illustrative example, consumer 222 has requested message 218. Message handler 214 sends message 218 from messaging system 202 to consumer 222 in consumers 208.

In this illustrative example, message handler 214 monitors the activity of consumer 222 with respect to messaging system 202. As depicted, interaction of consumer 222 with messaging system 202 is intercepted and handled by message handler 214.

In this illustrative example, consumer 222 itself is not directly monitored. Instead, activities such as a request for messages 204, a request to subscribe to a topic, a request to unsubscribe to a topic, or other activities in respect to messaging system 202 can be used to monitor the activity of consumer 222. In this illustrative example, consumer 222 request messages. In other words, producer 220 pushes messages 204, while consumer 222 pulls messages 204.

This type of monitoring of the activity of consumer 222 can be performed to determine whether adverse condition 224 is present for consumer 222 after sending message 218 to consumer 222. In this illustrative example, adverse condition 224 is selected from a group comprising a dropped connection, a period of time between the consumer 222 requesting messages exceeding a threshold, or some other undesired activity that indicates that consumer 222 may have an issue in processing message 218.

In response to adverse condition 224 being present for consumer 222 after sending message 218 to consumer 222, message handler 214 sends message 218 to a set of consumers 208 in addition to consumer 222. As used herein, "a set of," when used with reference to items, means one or more items. For example, "a set of consumers 208" is one or more of consumers 208.

The set of consumers 208 is used to verify or confirm whether message 218 is poison message 226. In some instances, a problem in a design, coding, or other mechanism in consumer 222 may cause adverse condition 224 rather than a problem with message 218.

In the illustrative example, the set of consumers 208 can be existing consumers that subscribe to receive messages 204 from messaging system 202. In another illustrative example, the set of consumers 208 can be created specifically for testing message 218 to determine whether message 218 is poison message 226.

For example, templates may be available for applications that are consumers 208 for different producers in producers 206. A template for a consumer that would process message 218 can be used to create the set of consumers 208. In other words, the set of consumers 208 is a set of test consumers created specifically to test message 218 to determine whether adverse condition 224 will occur in set of consumers 208. In this manner, actual consumers are not used for testing.

As depicted, message handler 214 determines whether adverse condition 224 is present for the set of consumers 208. If adverse condition 224 is present in the set of consumers 208, message 218 is confirmed to be poison message 226.

When poison message 226 is identified with adverse condition 224 being present in the set of consumers 208 receiving message 218, message handler 214 can perform a set of actions 219. The set of actions 219 is one or more actions and can take a number of different forms. For example, the set of actions 219 can be selected from at least one of restricting messages 204 from producer 220, sending a notification to an administrator, generating an alert, creating a log entry identifying adverse condition 224, or some other suitable action.

For example, when poison message 226 is identified with adverse condition 224 being present in the set of consumers 208 receiving message 218, message handler 214 identifies producer 220 using identifier 221 assigned to message 218. Message handler 214 then can restrict messages 204 from producer 220 identified from identifier 221 as an action.

The restriction can occur in a number of different ways. For example, message handler 214 can reduce the number of messages 204 received from producer 220 in response to adverse condition 224 being present in the set of consumers 208 receiving message 218. If the number of messages 204 is reduced to zero, then messages 204 from producer 220 are effectively blocked.

The restricting of messages 204 can be performed in a number of different ways. For example, message handler 214 can choose not to pass messages 204 from producer 220 to messaging system 202. These messages can be discarded. In some cases, the speed at which messages 204 from producer 220 are sent to messaging system 202 by message handler 214 may be at a slower rate. In yet another example, messages 204 from producer 220 can be rejected by message handler 214.

As another example, message handler 214 can restrict a number of consumers 208 that receives messages 204 from producer 220 in response to adverse condition 224 being present in the set of consumers 208 receiving message 218. For example, if the importance of messages 204 from producer 220 is great enough, a limited number of consumers 208 can still receive messages 204 from producer 220. The situation may occur when only a limited number of messages 204 from producer 220 are poison messages 216.

Message handler 214 can be implemented in software, hardware, firmware, or a combination thereof. When software is used, the operations performed by message handler 214 can be implemented in program code configured to run on hardware, such as a processor unit. When firmware is used, the operations performed by message handler 214 can be implemented in program code and data and stored in persistent memory to run on a processor unit. When hardware is employed, the hardware may include circuits that operate to perform the operations in message handler 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with handling poison messages in a messaging system in which data is not linked to a specific producer by the messaging system. As a result, one or more technical solutions provides a technical effect of confirming whether a poison message is present when a consumer of the message has an adverse condition after receiving a message. One or more technical solutions also may provide a technical effect of enabling identifying producers of poison messages such that appropriate actions can be taken with respect to those producers.

As a result, computer system 212 operates as a special purpose computer system in which message handler 214 in computer system 212 enables at least one of confirming whether a poison message is present or an identification of a producer originating a poison message. In particular, message handler 214 transforms computer system 212 into a special purpose computer system as compared to currently available general computer systems that do not have message handler 214.

The illustration of messaging environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, physical data processing systems are present that run program code for producers 206 and consumers 208. Although shown as components outside of computer system 212, one or more of producers 206 and consumers 208 can be located within computer system 212 in other illustrative examples.

Figure 3:
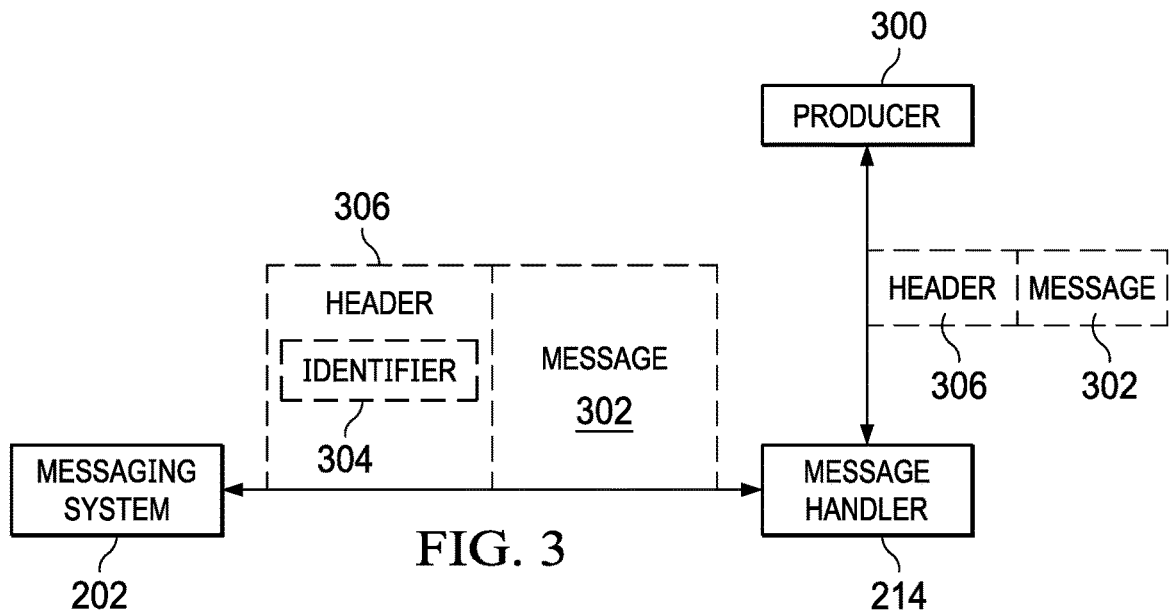
FIG. 3 is a dataflow diagram showing dataflow for receiving messages in accordance with an illustrative embodiment.

With reference next to FIG. 3, a dataflow diagram showing dataflow for receiving messages is depicted in accordance with an illustrative embodiment. In the illustrative examples, the same reference numeral may be used in more than one figure. This reuse of a reference numeral in different figures represents the same element in the different figures.

In this illustrative example, producer 300 sends message 302 to messaging system 202, which is intercepted by message handler 214. In this depicted example, message handler 214 adds identifier 304 to header 306 of message 302.

As depicted, message handler 214 sends message 302 with identifier 304 in header 306 of message 302 to messaging system 202 for storage and distribution. In this illustrative example, identifiers can be added to all the messages received from different producers. In some illustrative examples, the identifiers can be added only to producers of interest.

Figure 4:
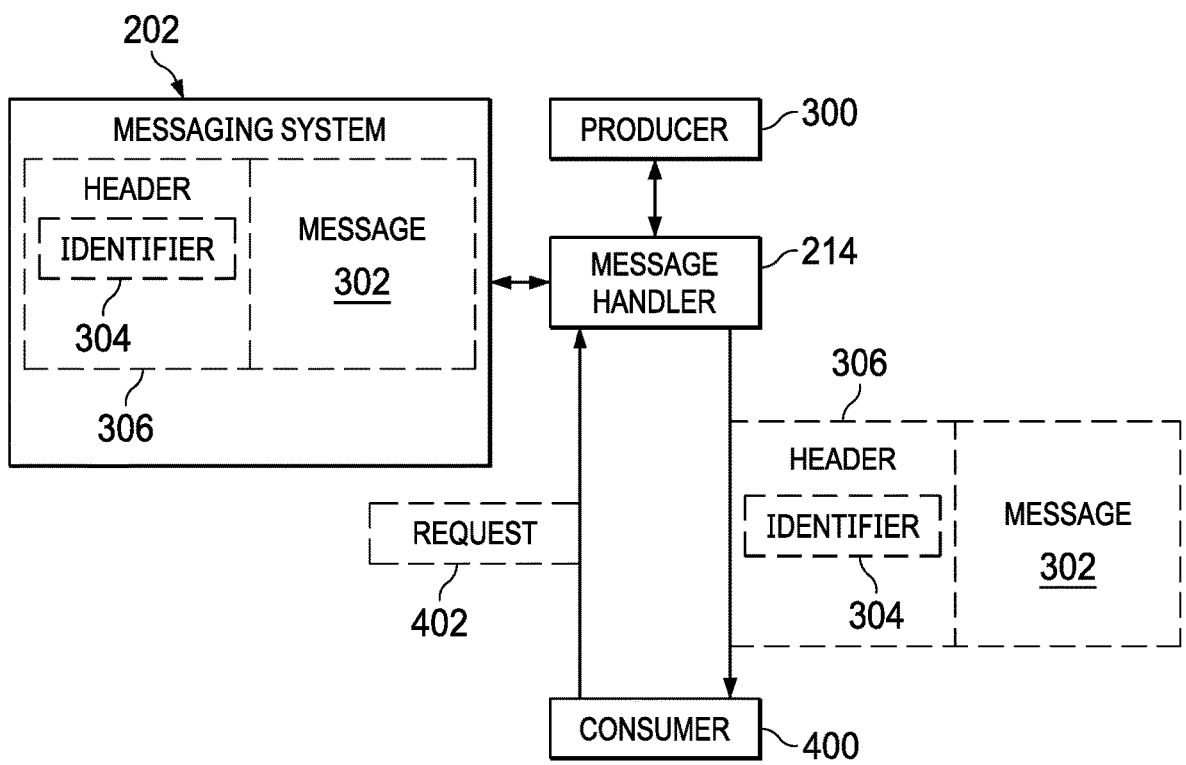
FIG. 4 is a dataflow diagram showing dataflow for message consumption in accordance with an illustrative embodiment.

Turning now to FIG. 4, a dataflow diagram showing dataflow for message consumption is depicted in accordance with an illustrative embodiment. In this figure, consumer 400 has established a connection to messaging system 202 through message handler 214. Message handler 214 intercepts requests sent by consumer 400 to messaging system 202.

As depicted, consumer 400 sends request 402 to messaging system 202 for a message. Request 402 can be for a message for a particular topic for which consumer 400 has subscribed. As depicted, request 402 is intercepted by message handler 214. Message handler 214 handles the request by obtaining message 302 from messaging system 202 and sending message 302 to consumer 400. Message 302 can optionally include metadata.

Thereafter, message handler 214 observes the behavior of consumer 400. This behavior is observed to determine the liveliness of consumer 400. This behavior includes, for example, whether another request is made, the amount of time that has occurred since the last request, a connection state, and other metrics that are observed with respect to the consumer 400. This observation is made to determine whether an adverse condition is present with respect to consumer 400.

Figure 5:
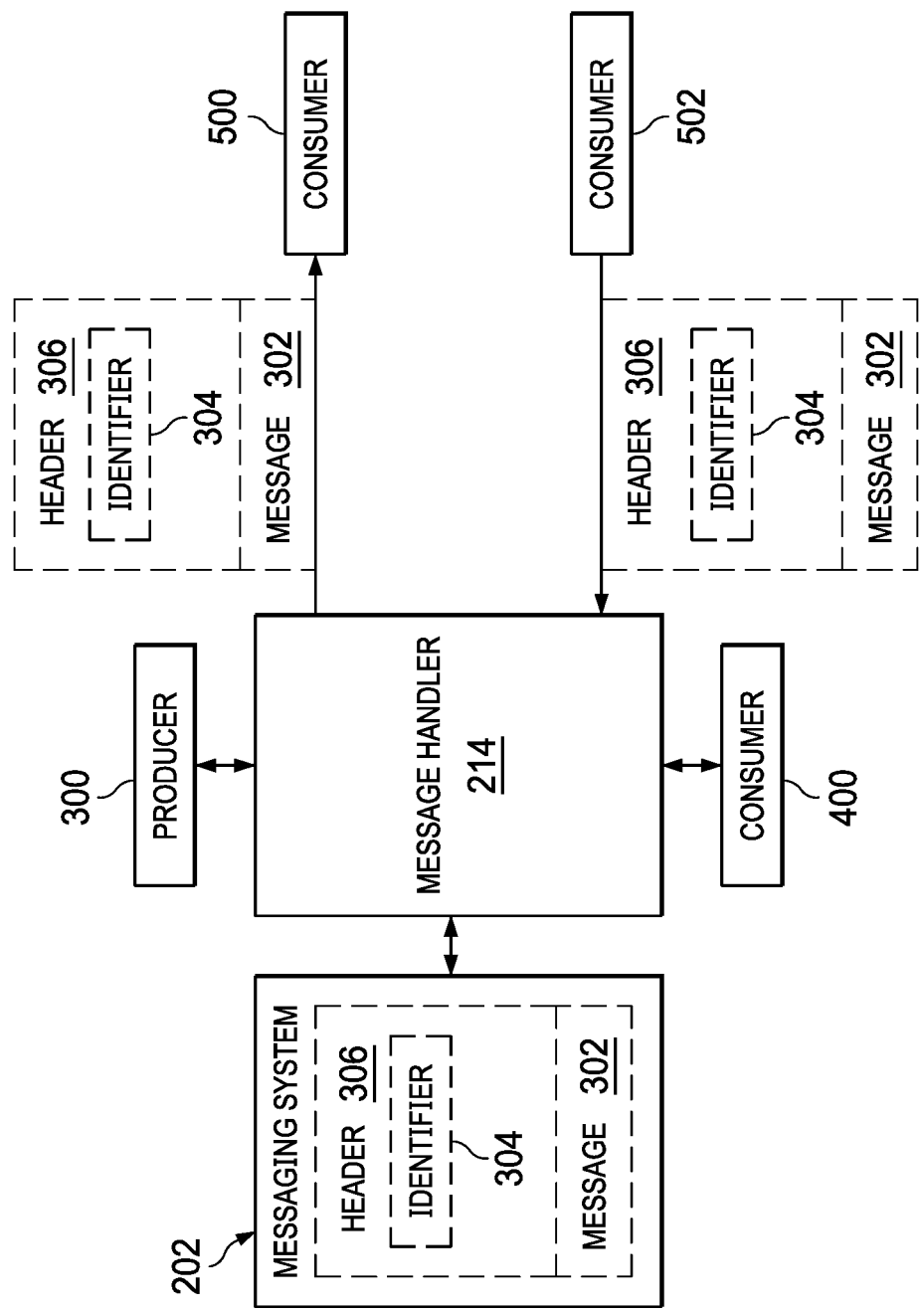
FIG. 5 is a dataflow diagram showing dataflow for poison message handling in accordance with an illustrative embodiment.

With reference to FIG. 5, a dataflow diagram showing dataflow for poison message handling is depicted in accordance with an illustrative embodiment. In this figure, an adverse condition has been detected with respect to consumer 400. For example, the period of time since consumer 400 has asked for a message may have exceeded some threshold indicating that consumer 400 may have hung or crashed. As another example, consumer 400 may have terminated the connection.

In this instance, message handler 214 can perform steps to determine whether the adverse condition was caused by sending message 302 to consumer 400. In other words, message handler 214 can confirm whether message 302 is a poison message.

Message handler 214 sends message 302 to consumer 500 and consumer 502. In this example, additional eligible consumers are present. For example, if messages are allowed to be delivered more than once, then message 302 can be sent to a set of consumers, such as consumer 500 and consumer 502. As depicted, consumer 500 and consumer 502 can be actual consumers or can be test consumers that are started specifically to receive messages that are suspected to be poison messages.

As depicted, message handler 214 observes activities of consumer 500 and consumer 502. Message handler 214 determines from observing the activities whether an adverse condition occurs in at least one of consumer 500 or consumer 502 after sending message 302 to these two consumers. If an adverse condition is present, message handler 214 identifies producer 300 from identifier 304.

In this illustrative example, different actions can be taken in respect to producer 300. For example, messages sent from producer 300 to messaging system 202 can be restricted. This restriction can include at least one of reducing the number of messages from producer 300, restricting the number of consumers that can receive messages from producer 300, or some other suitable action. The reduction of the number of messages that can be received or accepted from producer 300 can be as low as zero, effectively blocking messages from producer 300.

The dataflow shown in FIGS. 3-5 are for purposes of illustrating one illustrative example. This illustration is not meant to limit the manner in which other illustrative examples can be implemented. For example, the illustrative examples may use other numbers of consumers to test suspected poison messages. For example, one consumer, 10 consumers, or some other number of consumers can be used.

Figure 6:
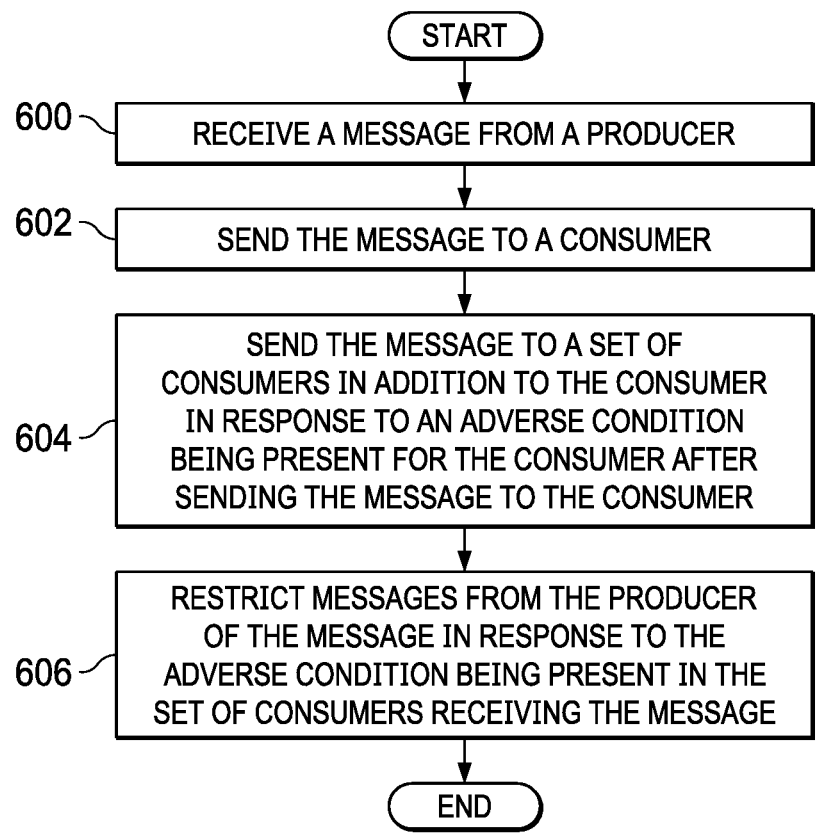
FIG. 6 is a flowchart of a process for processing messages in accordance with an illustrative embodiment.

Turning next to FIG. 6, a flowchart of a process for processing messages is depicted in accordance with an illustrative embodiment. The processes in FIG. 6 can be implemented in hardware, software, or both. When implemented in software, the processes can take the form of program code that is run by one of more processor units located in one or more hardware devices in one or more computer systems. For example, these processes can be implemented in message handler 214 in computer system 212 in FIG. 2.

The process begins by receiving a message from a producer (step 600). The process sends the message to a consumer (step 602). The process sends the message to a set of consumers in addition to the consumer in response to an adverse condition being present for the consumer after sending the message to the consumer (step 604). In step 604, the adverse condition can be a condition in which activity of the consumer, with respect to the messaging system, is abnormal or unexpected. For example, the consumer has an adverse condition when the consumer unexpectedly drops a connection or does not request another message for the period of time that exceeds some threshold that is considered normal.

The process restricts messages from the producer of the message in response to the adverse condition being present in the set of consumers receiving the message (step 606). The process terminates thereafter.

The restriction performed in step 606 can take a number of different forms. For example, the restriction can include reducing the number of messages from the producer. In another example, the restriction can include restricting the number of consumers that receive the messages from the producer. The reduction of the number of messages that can be received or accepted from the producer could be as low as zero, effectively blocking the producer. In yet another illustrative example, the process can remove the producer as an entity that can send the messages to the messaging system.

Figure 7:
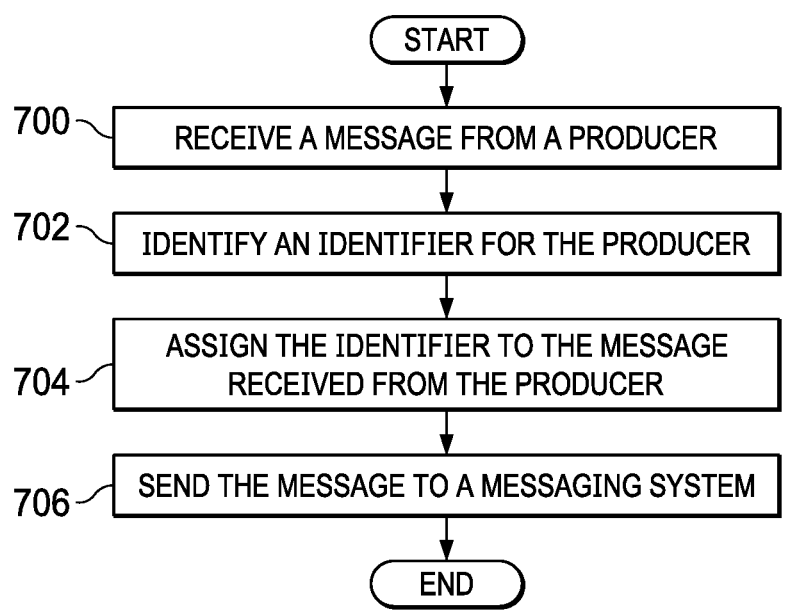
FIG. 7 is a flowchart of a process for identifying producers of messages in accordance with an illustrative embodiment.

With reference next to FIG. 7, a flowchart of a process for identifying producers of messages is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in message handler 214 in computer system 212 in FIG. 2.

The process begins by receiving a message from a producer (step 700). In step 702, the producer can be an entity that publishes data in messages for consumption. The process identifies an identifier for the producer (step 702). In this illustrative example, each producer sending the messages has an identifier that is unique for the producer. The process assigns the identifier to the message received from the producer (step 704). In step 704, the identifier can be in a custom header that is added to the message. This identifier uniquely identifies the producer sending the message from other producers also sending messages for processing. The process then sends the message to a messaging system (step 706). The process terminates thereafter.

Figure 8:
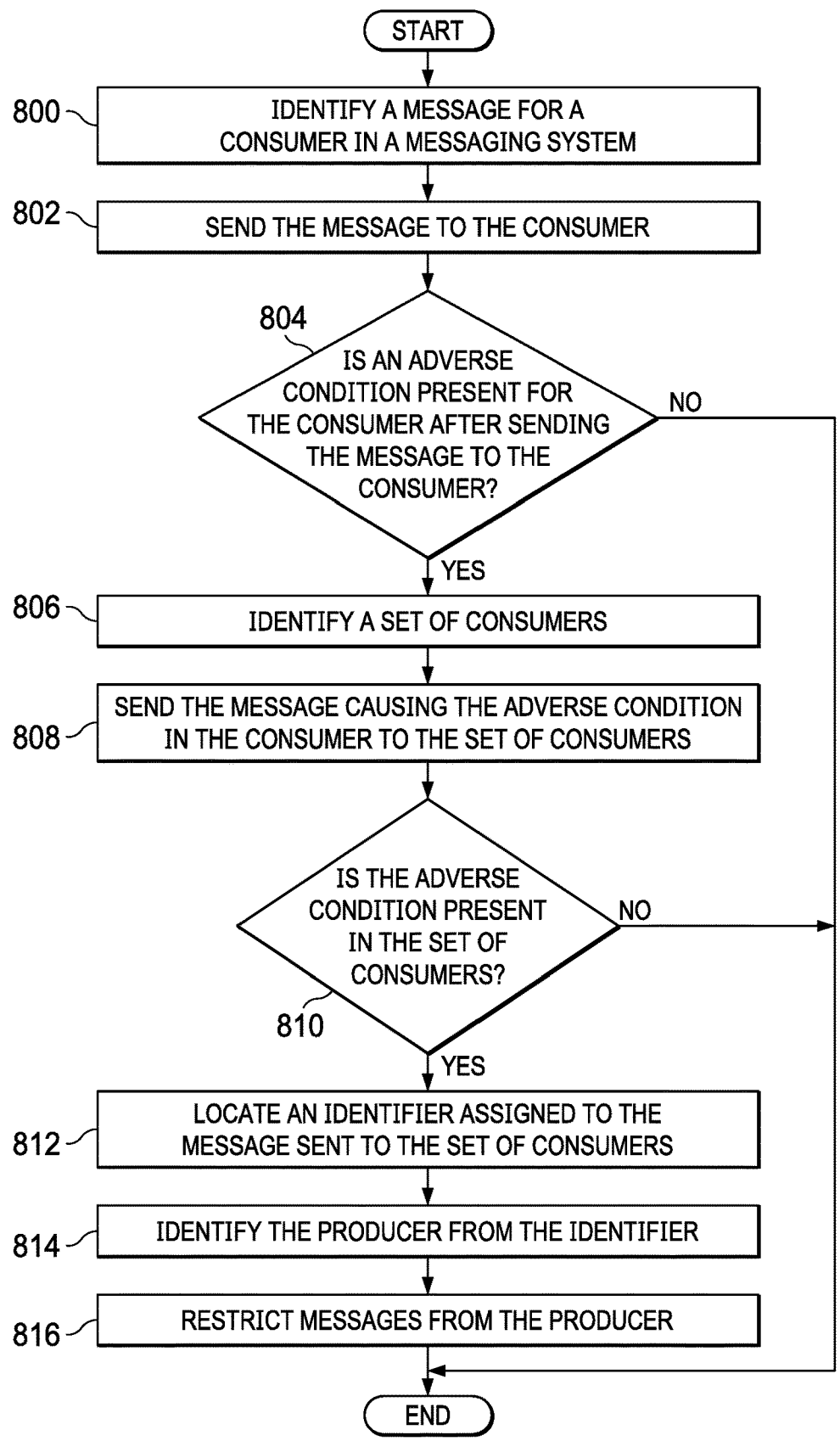
FIG. 8 is a flowchart of a process for detecting a poison message sent to a consumer in accordance with an illustrative embodiment.

With reference to FIG. 8, a flowchart of a process for detecting a poison message sent to a consumer is depicted in accordance with an illustrative embodiment. The processes in FIG. 8 can be implemented in hardware, software, or both. When implemented in software, the processes can take the form of program code that is run by one of more processor units located in one or more hardware devices in one or more computer systems. For example, these processes can be implemented in message handler 214 in computer system 212 in FIG. 2.

The process begins by identifying a message for a consumer in a messaging system (step 800). The process sends the message to the consumer (step 802). The process determines whether an adverse condition is present for the consumer after sending the message to the consumer (step 804). In step 804, the adverse condition can be, for example, a drop connection or the passing of a period of time without the consumer requesting another message in which the period of time is one that is greater than what is considered normal for the consumer.

If the adverse condition is not present, the process terminates. If the adverse condition is present, the process identifies a set of consumers (step 806). In step 806, the set of consumers can be consumers that already receive messages from the messaging system. In another illustrative example, the set of consumers can be test consumers that are generated specifically to test for poison messages. In other words, these test consumers are not consumers that normally receive messages. The consumers used for this purpose are "guinea pigs" or "canaries" and are used to determine whether a poison message is present.

The process sends the message causing the adverse condition in the consumer to the set of consumers (step 808). A determination is made as to whether the adverse condition is present in the set of consumers (step 810). In step 810, the adverse condition can be present in one or all of the consumers in the set of consumers.

If the adverse condition is present in the set of consumers, the process locates an identifier assigned to the message sent to the set of consumers (step 812). The process identifies the producer from the identifier (step 814).

The process restricts messages from the producer (step 816). The process terminates thereafter. With reference again to step 810, if the adverse condition is not present, the process also terminates. If the set of consumers does not have the adverse condition, this indicates that an issue is not caused by the message. The adverse condition could be caused by the consumer hanging or crashing for some other reason.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
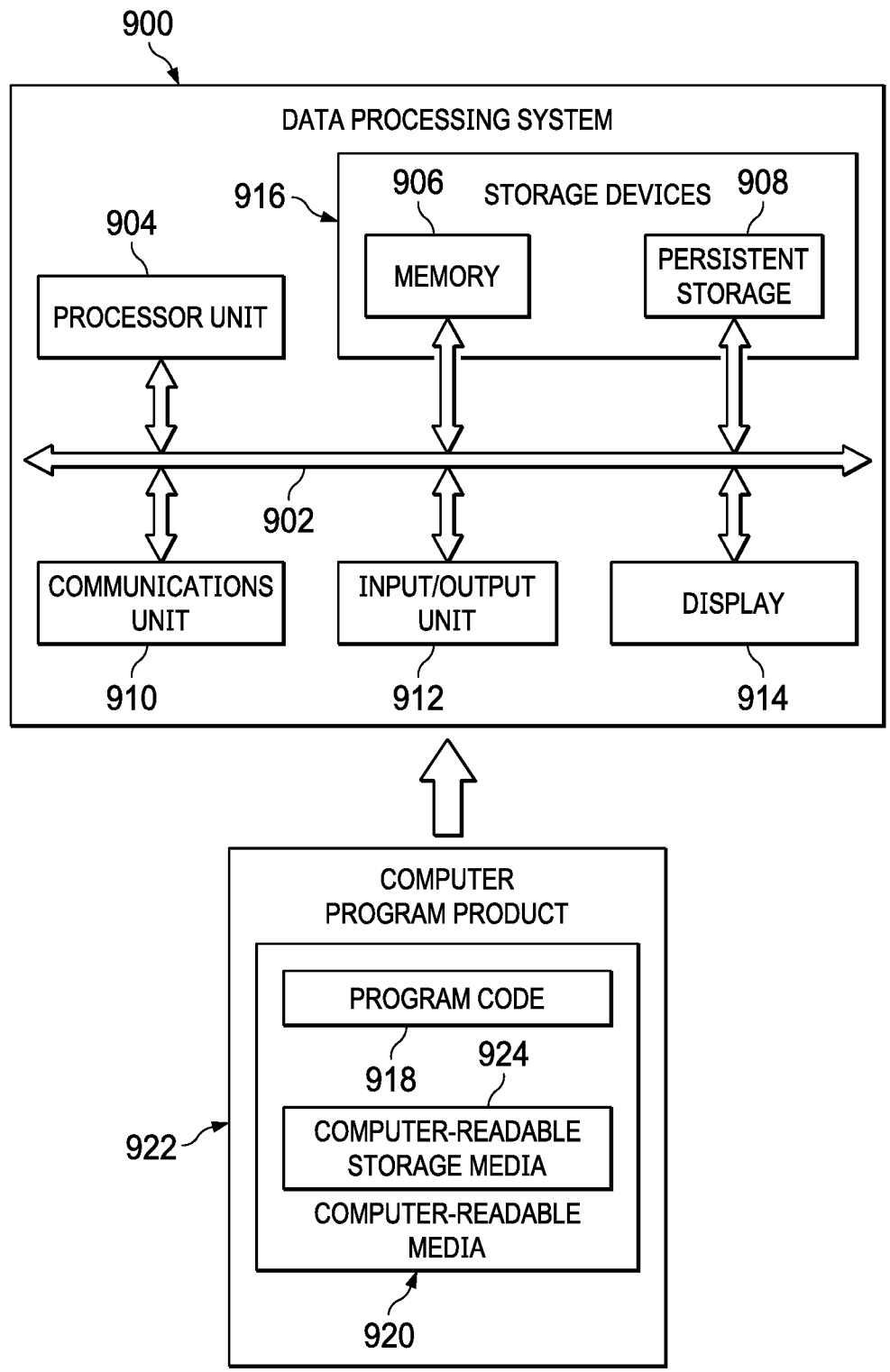
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 212 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 include one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and run by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, the 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Thus, illustrative embodiments of the present invention provide a computer-implemented method, computer system, and computer program product for processing messages. In one illustrative example, a computer system receives a message from a producer. The computer system assigns an identifier identifying the producer to the message. The computer system sends the message to a consumer. The computer system sends the message to a set of consumers in addition to the consumer in response to an adverse condition being present for the consumer after sending the message to the consumer. The computer system identifies the producer from the identifier assigned to the message, causing the adverse condition in the set of consumers. The computer system restricts the producer of the message in response to the adverse condition being present in the set of consumers receiving the message.

In one illustrative example, one or more technical solutions are present that overcome a technical problem with handling poison messages in a messaging system in which data is not linked to a specific producer by the messaging system. As a result, one or more technical solutions provides a technical effect of confirming whether a poison message is present when a consumer of the message has an adverse condition after receiving the message. One or more technical solutions also may provide a technical effect of enabling identifying producers of poison messages such that appropriate actions can be taken with respect to those producers.

In this manner, the illustrative examples enable determining whether a message is truly poisoned. One or more illustrative examples reduce problems of taking actions with respect to a producer when the issue is caused by the consumer. Additionally, one or more illustrative examples enable identifying the producer of the poison message in a messaging system such that the producer can be handled in a desired manner.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for processing messages, the method comprising:
   receiving, by a computer system, a message from a producer;
   sending, by the computer system, the message to a consumer;
   sending, by the computer system, the message to a set of consumers in addition to the consumer in response to an adverse condition being present for the consumer after sending the message the consumer; and
   performing, by the computer system, a set of actions in response to the adverse condition being present in the set of consumers receiving the message.

2. The method of claim 1, wherein performing, by the computer system, the set of actions in response to the adverse condition being present in the set of consumers receiving the message comprises:
   restricting, by the computer system, the messages from the producer of the message in response to the adverse condition being present in the set of consumers receiving the message.

3. The method of claim 2, wherein restricting, by the computer system, the messages from the producer in response to the adverse condition being present in the set of consumers receiving the message comprises:
   reducing, by the computer system, a number of the messages from the producer in response to the adverse condition being present in the set of consumers receiving the message.

4. The method of claim 2, wherein restricting, by the computer system, the messages from the producer in response to the adverse condition being present in the set of consumers receiving the message comprises:
   restricting, by the computer system, a number of consumers that receive the messages from the producer in response to the adverse condition being present in the set of consumers receiving the message.

5. The method of claim 1 further comprising:
   assigning, by the computer system, an identifier to the message, wherein the identifier identifies the producer of the message.

6. The method of claim 5, wherein performing, by the computer system, the set of actions in response to the adverse condition being present in the set of consumers receiving the message comprises:
   identifying, by the computer system, the producer using the identifier; and
   restricting, by the computer system, the messages from the producer identified from the identifier in response to the adverse condition being present in the set of consumers receiving the message.

7. The method of claim 6, wherein restricting, by the computer system, the messages from the producer of the message in response to the adverse condition being present in the set of consumers receiving the message comprises:
   reducing, by the computer system, a number of the messages from the producer in response to the adverse condition being present in the set of consumers receiving the message.

8. The method of claim 6, wherein restricting, by the computer system, the messages from the producer of the message in response to the adverse condition being present in the set of consumers receiving the message comprises:
   restricting a number of consumers that receives the messages from the producer in response to the adverse condition being present in the set of consumers receiving the message.

9. The method of claim 1, wherein the adverse condition is selected from a group comprising a dropped connection and a period of time between the consumer requesting the messages exceeds a threshold.

10. The method of claim 1, wherein the set of actions is selected from at least one of restricting the messages from the producer, sending a notification to an administrator, generating an alert, or creating a log entry identifying the adverse condition.

11. A message processing system comprising:
    a computer system, wherein the computer system receives a message from a producer; sends the message to a consumer; sends the message to a set of consumers in addition to the consumer in response to an adverse condition being present for the consumer after sending the message the consumer; and perform a set of actions in response to the adverse condition being present in the set of consumers receiving the message.

12. The message processing system of claim 11, wherein in performing the set of actions in response to the adverse condition being present in the set of consumers receiving the message, the computer system restricts messages from the producer of the message in response to the adverse condition being present in the set of consumers receiving the message.

13. The message processing system of claim 12, wherein in restricting the messages from the producer in response to the adverse condition being present in the set of consumers receiving the message, the computer system blocks the messages from the producer in response to the adverse condition being present in the set of consumers receiving the message.

14. The message processing system of claim 12, wherein in restricting the messages from the producer in response to the adverse condition being present in the set of consumers receiving the message, the computer system restricts a number of consumers that receives the messages from the producer in response to the adverse condition being present in the set of consumers receiving the message.

15. The message processing system of claim 11, wherein the computer system assigns an identifier to the message, wherein the identifier identifies the producer of the message.

16. The message processing system of claim 15, wherein in performing the set of actions in response to the adverse condition being present in the set of consumers receiving the message, the computer system, the computer system identifies the producer using the identifier and restricts the messages from the producer identified from the identifier in response to the adverse condition being present in the set of consumers receiving the message.

17. The message processing system of claim 16, wherein in restricting the messages from the producer of the message in response to the adverse condition being present in the set of consumers receiving the message, the computer system blocks the messages from the producer in response to the adverse condition being present in the set of consumers receiving the message.

18. The message processing system of claim 16, wherein in restricting the messages from the producer of the message in response to the adverse condition being present in the set of consumers receiving the message, the computer system restricting a number of consumers receives the messages from the producer in response to the adverse condition being present in the set of consumers receiving the message.

19. A computer program product for processing messages, the computer program product comprising:

a computer-readable storage media;

first program code, stored on the computer-readable storage media, for receiving a message from a producer;

second program code, stored on the computer-readable storage media, for sending the message to a consumer;

third program code, stored on the computer-readable storage media, for sending the message to a set of consumers in addition to the consumer in response to an adverse condition being present for the consumer after sending the message the consumer; and fourth program code, stored on the computer-readable storage media, for performing a set of actions in response to the adverse condition being present in the set of consumers receiving the message.

20. The computer program product of claim 19, wherein the fourth program code comprises program code, stored on the computer-readable storage media, for restricting the messages from the producer of the message in response to the adverse condition being present in the set of consumers receiving the message.

* * * * *